Aug. 10, 1965　　E. V. CALDWELL　　3,199,890
WHEEL MOUNTING
Filed June 21, 1963
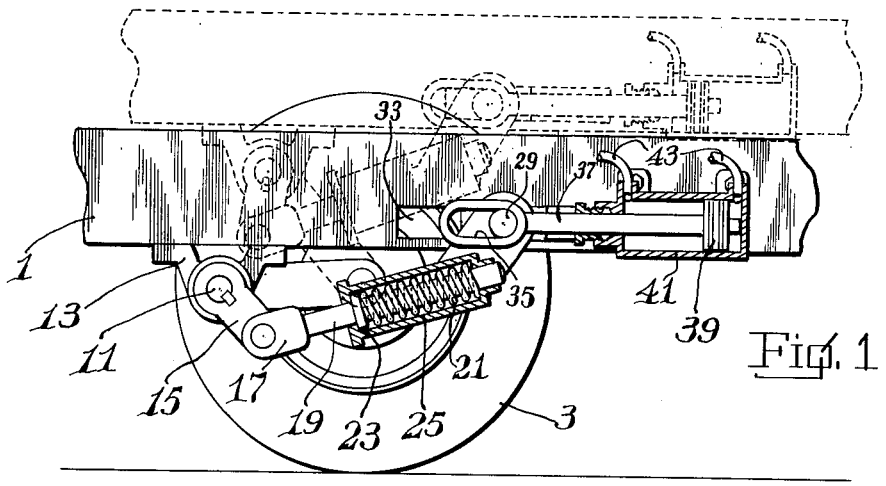
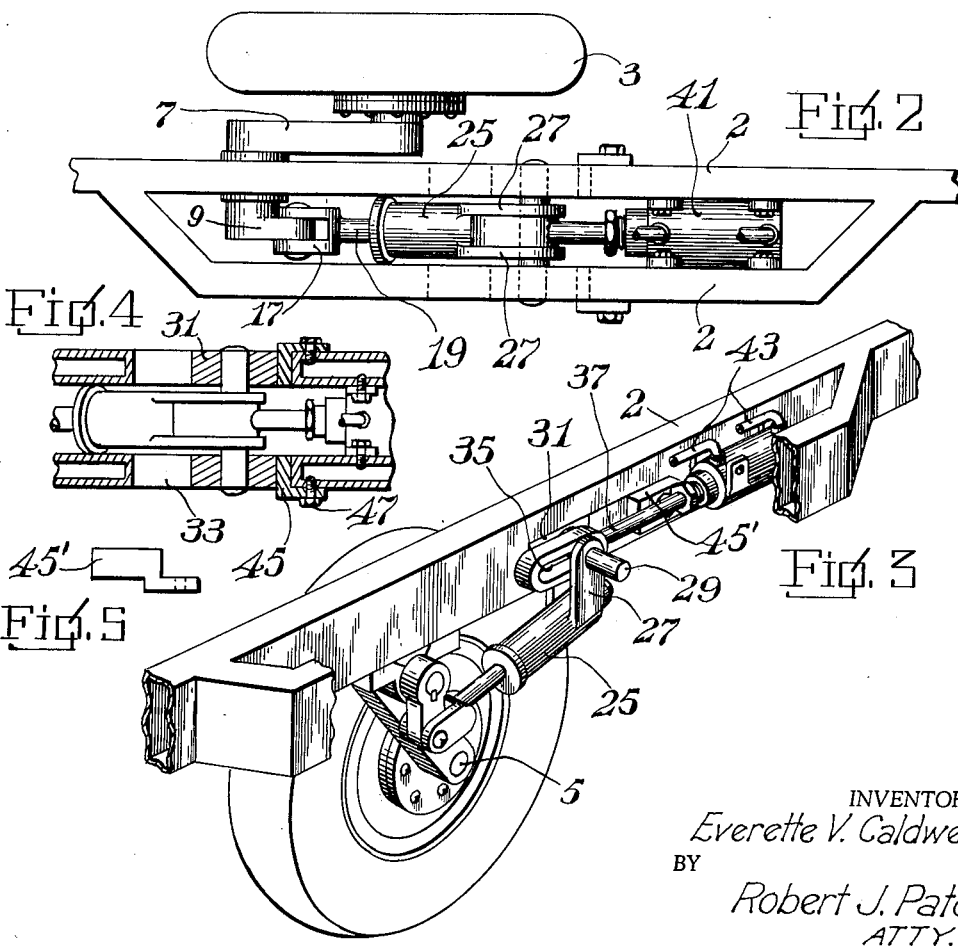
INVENTOR.
*Everette V. Caldwell*
BY
*Robert J. Patch*
ATTY.

United States Patent Office

3,199,890
Patented Aug. 10, 1965

3,199,890
WHEEL MOUNTING
Everette V. Caldwell, 4145 S. Norfolk Ave., Tulsa, Okla.
Filed June 21, 1963, Ser. No. 289,597
3 Claims. (Cl. 280—43.23)

The present invention relates to wheel mountings, more particularly of the type in which a wheel and a vehicle chassis it supports are vertically adjustable relative to each other.

It is an object of this invention to provide wheel mountings having vertical adjustment means that do not transmit road shocks from the wheel to the chassis.

Another object of the present invention is the provision of wheel mountings vertically adjustable relative to a chassis by means of a fluid motor but that do not transmit road shocks to the fluid motor.

Still another object of the present invention is the provision of a vertically adjustable wheel mounting actuated by a fluid motor and adapted to avoid imparting shock to the fluid motor upon rebound of the wheel following a road shock.

Finally, it is an object of the present invention to provide wheel mountings that will be relatively simple and inexpensive to manufacture, easy to install, service, maintain and repair, and rugged and durable in use.

Other objects and advantages of the present invention will become apparent from a consideration of the following description, taken in connection with the accompanying drawing, in which:

FIGURE 1 is an inner side view of a wheel mounting according to the present invention, showing a depressed chassis position in full line and an elevated chassis position in dotted line;

FIGURE 2 is a plan view of the structure of FIGURE 1;

FIGURE 3 is a perspective view of the structure of FIGURES 1 and 2;

FIGURE 4 is a fragmentary cross-sectional view of a portion of the structure shown in FIGURE 2; and FIGURE 5 is a view of a modified form of stop block according to the invention.

Referring now to the drawing in greater detail, there is shown a vehicle chassis 1 comprising a pair of spaced parallel longitudinally extending frame members 2 on the outer side of which is disposed a wheel 3 by which at least the illustrated portion of the chassis is adjustably supported at an elevation above ground level. Wheel 3 is mounted for rotation on a horizontal axle 5 extending transversely of the length and line of direction of movement of the vehicle chassis, and axle 5 is carried by forwardly and upwardly extending relatively long arm 7 of a bell crank 9. Crank 9 includes a horizontal axle 11 rotatable about a horizontal axis parallel to the axis of rotation of wheel 3 in the direction of vehicle movement. Axle 11 is carried by chassis 1 by means of a bracket 13 mounted on the underside of the outer frame member 2. Bell crank 9 includes a second relatively short arm 15 disposed at an acute angle to arm 7. At its lower or free end, arm 15 is pivotally secured in a clevis 17 on the forward end of a rod 19. A coil compression spring 21 encircles rod 19 and bears continuously yieldably against an abutment 23 that encircles rod 19. Spring 21 and abutment 23 are confined within a cylindrical housing 25.

Housing 25 in turn carries a pair of rearwardly and upwardly extending ears that define a yoke 27, through the upper and rear ends of which passes a pin 29 in unitary assembly with a block 31 on either end of pin 29. The blocks 31, in turn, ride in horizontal slots 33 one in each parallel frame member of chassis 1.

Pin 29, in turn, is disposed in a generally horizontal slot 35 at the forward end of a generally horizontal piston rod 37 that carries at its rear end a piston 39 that rides in a cylinder 41 fixedly secured to chassis 1 between side frame members 2 thereof. Conduits 43 supply and exhaust pressure fluid to and from cylinder 41 to and from a source of pressure fluid (not shown), so that the cylinder and piston assembly functions as a fluid motor that acts through piston rod 37, through pin 29, through yoke, 27, and housing 25 and spring 21 and abutment 23 and rod 19 and clevis 17 and bell crank 9 to wheel 3 to swing bell crank 9 about its axis in such a way as to raise or lower the wheel and the chassis relative to each other as shown by comparison of the two positions illustrated in FIGURE 1.

It should also be noted that slot 35 provides a lost-motion connection between pin 29 and piston rod 37, and that the forward end of rod 37 is disposed between the ears that comprise yoke 27, which in turn is disposed between the frame members 2 of the chassis.

The weight of the vehicle that is borne by wheel 3 thus urges bell crank 9 counterclockwise as seen in FIGURE 1, and this thrust is transmitted back to the fluid motor, that portion of the chamber of the fluid motor to the right of piston 39 as seen in FIGURE 1 being filled with pressure fluid that maintains chassis 1 at the desired elevation. When wheel 3 passes over a bump or otherwise receives a road shock, that shock is largely absorbed by spring 21 and is passed back to the fluid motor, if at all, only in a very mild form, so that damage to the fluid motor is avoided. In the other direction, should wheel 3 drop suddenly relative to the chassis, then if spring 21 is at all compressed, it can expand until abutment 23 strikes the forward portion of spring housing 25. Even so, the shock of the falling wheel is not transmitted to the fluid motor, for the lost-motion connection provided by slot 35 then allows pin 29 to move to the left as shown in FIGURE 1 a distance to compensate for the fall of the wheel. In normal operation, therefore, coil compression spring 21 will bear the thrust imposed by the weight of the chassis on the wheel and will take up the additional sharp road shocks to prevent their transmission to the fluid motor, while upon dropping of the wheel, first the expansion of the spring 21 and then the lost-motion connection of the slot 35 will prevent shock from being transmitted to the fluid motor. Of course, it is more important to guard against the transmission of road shocks to the fluid motor than to guard against the transmission of shocks from the falling wheel, for road shocks are opposed by the entire momentum of the chassis, while the falling wheel can impart a shock due only to the momentum of the wheel itself.

As a still further protection against the transmission of road shocks to the fluid motor, means are provided for positively limiting the rearward movement of pin 29, that is, the movement of pin 29 to the right as seen in FIGURE 1. These means take the form of stop blocks 45 that are placed in the rear of both slots 33 and that are removably secured in place by means of fasteners in the form of bolts 47 that pass through rearwardly extending ears of stop blocks 45 and screw threadedly engage in chassis 1. These stop blocks 45 should fill as much of the space as possible between blocks 31 and the rear ends of slots 33; and for this purpose, a variety of blocks 45 are provided characterized by portions of different longitudinal extent in slot 33. Thus, a comparison of FIGURES 4 and 5 shows that a thin or short block 45 may be used as in FIGURE 4 when the chassis is relatively low as in the full-line position of FIGURE 1, but that a relatively thick or long block 45′, as seen in FIGURE 5, should be used when the chassis is in an elevated position more as shown in the dotted-line position of FIGURE 1. When blocks 31 are thus disposed in a rearmost position against stop blocks 45, pin 29 cannot move to the rear and road shock cannot be transmitted to the fluid motor. Instead, road shock is transmitted through pin 29 and blocks 31 to stop blocks 45 and to chassis 1, thereby bypassing the fluid motor entirely.

From a consideration of the foregoing description, it will be obvious that all of the initially recited objects of this invention have been achieved.

Although the present invention has been described and illustrated in connection with preferred embodiments, it is to be understood that modifications and variations may be resorted to without departing from the spirit of the invention, as those skilled in the art will readily understand. Such modifications and variations are considered to be within the purview and scope of the present invention as defined by the appended claims.

What is claimed is:

1. In a wheeled vehicle having a chassis and a wheel supporting the chassis, the improvement comprising means mounting the wheel for movement relative to the chassis comprising a bell crank mounted on the chassis for rotation about a first horizontal axis, the bell crank having a pair of arms extending away from said first axis, the wheel being mounted on one said arm for rotation about a second horizontal axis spaced from and parallel to said first axis, and means carried by the chassis and acting against the other arm continuously yieldably to press the wheel against a subjacent support, the last-named means including a coil compression spring, a fluid motor between the chassis and the spring, and a lost motion connection between the fluid motor and the spring and interconnecting the fluid motor and the spring for vertical swinging movement relative to each other.

2. The structure claimed in claim 1, the fluid motor including a cylinder and a piston having a piston rod, said lost motion connection including a pin mounted for movement with said spring and means carried by the piston rod and defining a slot elongated in a direction parallel to the length of the piston rod, said pin being disposed in said slot for sliding movement lengthwise of the slot.

3. The structure claimed in claim 2, and guide means on the chassis for guiding said pin in a direction parallel to the length of the slot.

References Cited by the Examiner
UNITED STATES PATENTS

| | | | |
|---|---|---|---|
| 2,563,919 | 8/51 | Christiansen | 280—43.17 X |
| 2,788,908 | 4/57 | Lynd | 280—43.23 X |
| 2,918,298 | 12/59 | Starr | 280—43.23 |
| 3,130,980 | 4/64 | Monroe et al. | 280—43.23 |

A. HARRY LEVY, *Primary Examiner.*

PHILIP ARNOLD, *Examiner.*